Oct. 22, 1957     D. A. TAYLOR     2,810,671
FLOOR MATS FOR AUTOMOBILES

Filed March 12, 1956     2 Sheets-Sheet 1

INVENTOR.
Don A. Taylor,
BY
Geler & Leonard,
his ATTORNEYS

Oct. 22, 1957

D. A. TAYLOR 2,810,671

FLOOR MATS FOR AUTOMOBILES

Filed March 12, 1956

INVENTOR.
Don A. Taylor,
BY
Gehr & Leonard,
his ATTORNEYS

United States Patent Office 2,810,671
Patented Oct. 22, 1957

2,810,671

FLOOR MATS FOR AUTOMOBILES

Don A. Taylor, Wadsworth, Ohio

Application March 12, 1956, Serial No. 570,775

13 Claims. (Cl. 154—49)

This invention relates to floor mats for automobiles and particularly to a floor mat used for protecting the conventional automobile floor rug which, in present day automobiles, is generally expensive and easily soiled.

Mats for overlying automobile floor rugs generally consist of molded rubber or plastic material having up-standing criss-crossing integral ribs which define, at the upper face of the mat, concavities or pockets which open upwardly and which are arranged in various regular geometric patterns. In some instances the ribs are parallel and extend transversely of the mat entirely to the lateral margins thereof which are raised to about the same height as the ribs so that the resultant concavities are narrow and elongated, being bounded by two adjacent ribs and the opposite lateral margins of the mat.

The concavities in such mats catch the soiled water, slush, and soft flowable mud and the like tracked into the compartment and retain the same so that it does not run over the edges of the mat onto the conventional underlying rug.

Mats now on the market function well for this initial purpose but quite frequently, after the soiled water, slush, or mud has been trapped in the pockets or concavities and the moisture content has been evaporated due to heat or drafts in the automobile, the pockets or concavities are filled with the dry solid residue of the tracked-in material. This residue soon becomes pulverized into a fine dust and blows about the automobile.

Furthermore, such mats are not particularly attractive in appearance, and, accordingly, quite frequently the auto owner removes them in the summer season despite the fact that he would like to have them at hand in rainy weather.

In accordance with the present invention, a mat is provided which performs the functions of the prior mats and at the same time eliminates the objectional operational features thereof.

Further, the present mat is more attractive and can be readily blended with the color scheme of the interior of the automobile. It is arranged in two parts, the upper part of which has a smooth decorated upper face and is made of a very highly wear resistant material while the under portion may be made of a material which is much less wear resistant and expensive. The upper part of the present mat is detachable and can be readily stored, if desired, when not in use.

Another advantage of the present mat resides in the fact that in the summer, when the tracked in mud and soiled water tend to dry out quickly when trapped in the concavities of the conventional mat, the mud and residue are prevented from blowing about on the interior of the automobile and instead are retained in the concavities but can be removed conveniently by merely lifting out the mat, removing the top part, and emptying the contents of the pickets or concavities. Additionally, any water, thin mud, and slush tracked into the automobile are trapped in a condition in which they are less likely to soil the clothes or to be splashed about the automobile interior, and less likely to dry out and pulverize quickly.

Various objects and advantages of the invention will become apparent from the following description wherein reference is made to the drawings, in which.

Figure 4:
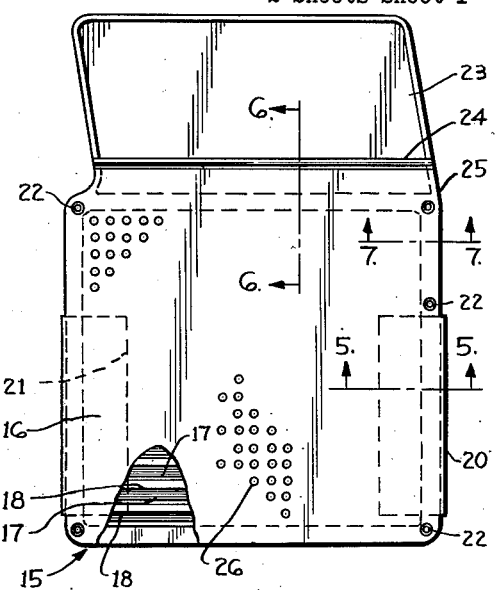
Fig. 4 is a view similar to Fig. 1 showing a modification of the bottom mat and cover mat.
Figure 2:
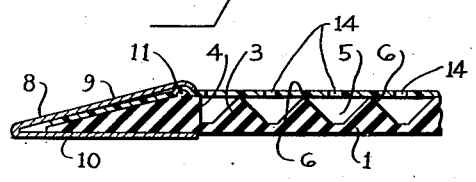
Fig. 2 is an enlarged fragmentary cross sectional view taken on the line 2—2 in Fig. 1.
Figure 5:
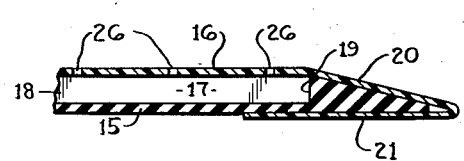
Figure 7:
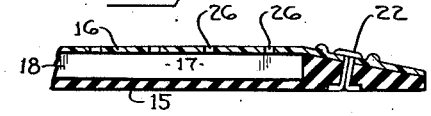
Figure 6:
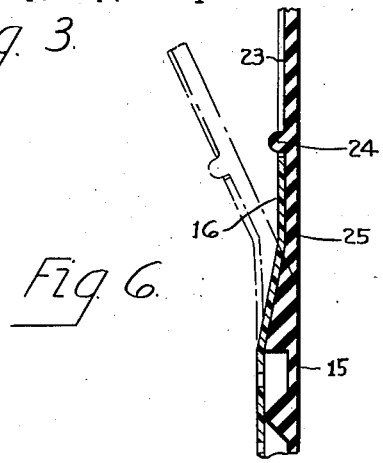
Figure 8:
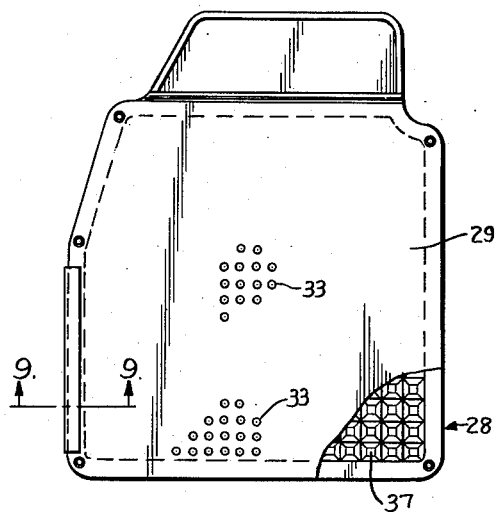
Figure 9:
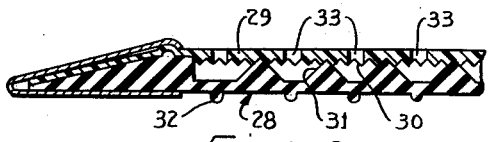
Figure 10:
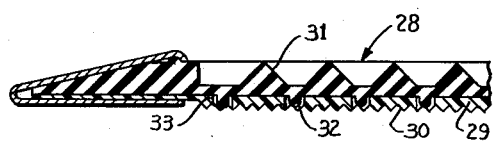
Figure 12:
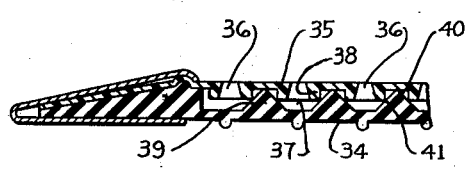
Figure 11:
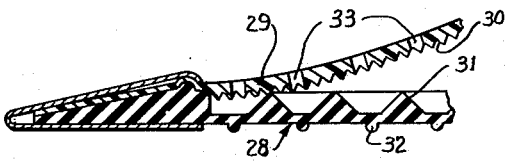

Figs. 5, 6, and 7 are enlarged fragmentary sectional views taken on the lines 5—5, 6—6, and 7—7 of Fig. 4;

Fig. 8 is a top plan view of another modified form of the mat, part of the cover mat being cut away for clearness in illustration;

Fig. 9 is an enlarged fragmentary sectional view taken on the line 9—9 in Fig. 8;

Fig. 10 is a view similar to Fig. 9 but showing the cover mat stored beneath the bottom mat;

Fig. 11 is a view similar to Fig. 9 showing the cover mat being removed from, or installed on, the bottom mat; and Fig. 12 is a view similar to Fig. 10 illustrating a modified form of the cover mat.

Figure 1:
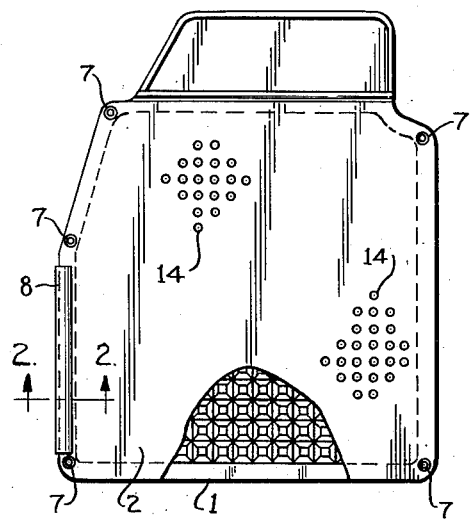
Fig. 1 is a top plan view of a mat embodying the principles of the present invention and including a bottom mat and a cover mat therefor, part of the cover mat being cut away for clearness in illustration.

Referring first to Fig. 1, the mat comprises a bottom mat 1 and a cover mat 2. The bottom mat 1 shown in Fig. 1 is adapted to fit the front compartment of an automobile body, on the driver's side.

The bottom mat is composed of rubber or other flexible and resilient plastic material which is sufficiently resistant to flexure so that the portions of the mat resist distortion and are self-restoring after deformation. The mat as a whole is sufficiently flexible to conform to the contour of the floor of the compartment when laid thereon.

The bottom mat is characterized by having a plurality of upstanding ribs 3 and margins 4 which define a plurality of concavities 5, each of which opens upwardly and is isolated from those adjacent to it. These concavities are relatively deep so as to retain water, slush, mud and the like tracked into the compartment.

The cover mat 2 comprises a thin flexible sheet of plastic which is preferably of a much higher quality plastic material than that used for the bottom mat. The cover mat has substantially the same in outline as the bottom mat so as to completely cover it when the bottom mat is in place on the floor with the top mat juxtaposed on the bottom mat. The cover mat rests on upper edges 6 of the ribs 3 defining the concavities 5. Since these upper edges are relatively narrow, any stresses and downward pressure applied on the top mat by the feet of the operator of the automobile tend to be concentrated along the areas of contact between the cover mat 2 and the top edges 6 of the ribs 3 adjacent the zone of pressure application. It has been found that the frictional binding engagement of the two mats at these areas of contact under these conditions is generally sufficient to prevent displacement of the cover mat 2 from its installed position in the plane of the mats.

If desired, however, suitable metal fasteners 7 may be provided about the periphery of the cover mat 2 and extend into suitable recesses in the bottom mat 1.

Since a floor mat is subject to considerable wear adjacent the door on the driver's side, a scuff plate 8 of metal or relatively stiff but resilient plastic may be provided. The plate 8 has an upwardly disposed portion 9 which overlies the cover mat 2 and presses it against the margin of the bottom mat 1 and also has a bottom portion 10 adapted to underlie the margin of the bottom mat 1 and press it toward the cover mat 2.

If desired, the entire scuff plate may be made of relatively springy material so that the portions 9 and 10 exert a firm clamping action on the margins of the bottom mat and cover mat.

The bottom mat has a peripheral bead 11 which extends upwardly near, and continuously along, the inner limit of the margin 4, being coextensive in length therewith. The portion 9 of the scuff plate has at its free edge, an inturned end margin adapted to press that portion of the cover mat 2 overlying the bead 11 into firm juxtaposition with the bead.

The mat 2 is provided with a plurality of apertures 14. Preferably the apertures are arranged in alignment with the concavities or pockets 5, respectively, at least one aperture to each pocket. The apertures are sufficiently small to permit water to drain through the cover mat 2 into the concavities 5 of the bottom mat and to permit soft mud to work therethrough as it is pressed on the cover mat by the feet of an operator. Thus the water, mud, and the like are trapped in the concavities. This is assisted in many instances by the fact that localized areas of the cover mat are pressed partway into their underlying concavities by the pressure of the operator's feet and, when this pressure is relieved, the cover mat, being resilient and self-restoring, causes a suction in the underlying concavities which draws in the water and soft mud. Since evaporation from the concavities is considerably reduced due to the reduction of free circulation of the air by the cover mat 2, the limited size of the apertures preventing ready access of air into the concavities, the mud and soiled water which drains into the concavities remains therein for long intervals in sufficiently moist condition so that it does not form a dust and blow out of the concavities into the interior of the automobile. If, of course, it does become dry it is not readily pulverized by the operator's feet due to the mat 2, and if pulverized, it is not readily dislodged from the concavities by extraneous drafts due to the cover mat and limited size of the apertures.

The upper surface of the cover mat, being smooth, can readily be wiped off and kept free from excessive accumulations of mud and the like.

Figure 3:
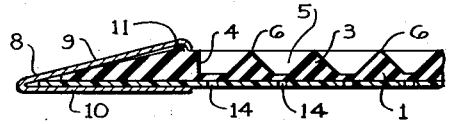
Fig. 3 is a view similar to Fig. 2 but showing the cover mat in stored position beneath the bottom mat.

Referring next to Fig. 3, in some instances it may be desirable to remove the cover mat 2 and store it. For this purpose it is merely removed and placed beneath the bottom mat so as to lie next to the floor. Then scuff plates 8 are reinstalled.

Referring next to Fig. 4, there is illustrated a bottom mat 15 and a cover mat 16, the mat 15 being the same as the mat 1 heretofore described except that, instead of the small concavities, it is provided with elongated concavities 17 defined by parallel ribs 18 and raised margins 19. These concavities, likewise, readily trap water, slush, soft mud, and the like. In this form of mat, the scuff plates are not shown but the upper mat 16 is provided with an upwardly exposed marginal portion 20 and, at the location where the scuff plates ordinarily would be located, a lower marginal portion 21. When the mat 16 is installed on the mat 15, the marginal portion 20 overlies the margin 19 of the bottom mat 15 and the marginal portion 21 underlies at least the marginal portion of the bottom mat 15.

If desired, metal fasteners such as indicated at 22 may be provided for securing the cover mat to the bottom mat but generally this is not required due to the frictional engagement of the cover mat and the upper edges of the ribs 18.

The bottom mat 15 is provided with the usual flat apron 23 which is adapted to lie against the upwardly sloping forwardly portion of the floor of the front compartment of the automobile. This apron is arranged to drain downwardly onto the mat.

In accordance with the present invention, the apron 23 is provided at its lower limit with a small bead 24 which extends for the entire width of the apron 23 and is integral with the mat. This rib is preferably spaced slightly above the breakline, indicated at 25, at which the upward slope of the apron 23 begins when the mat 15 is installed. Thus when the bottom mat 15 with the top mat thereon are installed and the apron flexed upwardly, the bead 24 pushes down firmly against the forward edge of the cover mat 16, forming an effective seal and assuring that the drainage of the apron will be onto the top of the mat 16 which will tend to distribute it more effectively. The mat 16 is provided with apertures 26 which are distributed over the surface so that at least one aperture is aligned with each of the concavities 17.

Referring next to Fig. 8 through Fig. 10, there are illustrated a bottom mat 28 and a cover mat 29. The cover mat 29 is similar to the mat 2 except that on its undersurface it is provided with a plurality of small nibs 30 which are uniformly distributed about the undersurface. In the form illustrated, the nibs 30 are pyramidal, disposed with their apices pointing downwardly. These nibs interlock with the upper margins of the upwardly projecting ribs 31 of the bottom mat 28 thus interlocking the mats against displacement edgewise in their plane.

Quite frequently, as illustrated in Fig. 9, the bottom mats are provided with nibs 32 which hold them slightly separated from the floor and permit a certain amount of air circulation for removing moisture that might otherwise become excessive therebeneath. In the form illustrated in Fig. 9, the top mat is provided with apertures 33 which are positioned a distance apart such that each of the nibs 32 can engage in one of the apertures 33 when the top mat is disposed for storage beneath the bottom mat, as illustrated in Fig. 10.

In Fig. 12 there is illustrated a modification of a top mat. In this figure the bottom mat 34 is the same as the bottom mat 28 described in connection with Fig. 9. The cover mat 35, however, has apertures 36 arranged in alignment with concavities 37, respectively, of the bottom mat. On the underside of the cover mat 35 are annular marginal ribs 38 which project downwardly in surrounding relation to the apertures 36, respectively. The bottom mat has ribs 39 which define concavities 37 and isolate them from each other. The upper edges 40 of the ribs 39 preferably engage the underface of the cover mat in the spaces between adjacent marginal ribs 38. The marginal ribs 38 are of sufficient outside diameter and axial dimension so that they engage the side surfaces of the ribs 39 between their bases and apexes, as indicated at 41. Thus these marginal ribs 38 interlock the cover mat with the bottom mat and at the same time tend to prevent undue elastic deformation of the cover mat downwardly when the pressure of a person's heel is concentrated over the area of one of the concavities.

In all of the forms illustrated, the upper mat may be made in a plurality of colors so that the owner of the automobile may select that which blends more effectively with the interior of the automobile.

Furthermore, the cover mat tends to reinforce the bottom mat and cooperates therewith to render the combination somewhat stiffer and thus prevent undesirable flexing, and creeping, when the mat is stepped upon and resultant cracking of the bottom mat.

The perforations in the forms illustrated may be of any shape desired and preferably are distributed over the entire area of the cover mat though, if desired, they may be limited to that portion of the cover mat toward which the mat usually drains.

The interlocking of the nibs 32 of the bottom mat with the stronger cover mat when it is placed beneath the bottom mat for storage, as illustrated in Fig. 10, reinforces the bottom mat which, being of lower quality, is apt to tear and crack apart if repeatedly stressed, and thus increases the life of the bottom mat.

The cover mat preferably is highly resistant to abrasion. It may be made of rubber, tough plastic such as vinyl and the like, or any suitable material, or may be a fabricated structure composed of laminations of different materials.

I claim:

1. A floor mat for automobiles and comprising an imperforate, flexible, molded bottom mat having a plurality of upstanding integral imperforate ribs on its upper face and defining a multiplicity of imperforate wall concavities which are open upwardly and are isolated from each other, a thinner, tough cover mat of water-proof material overlying said upper face and resting on the upper edges of the ribs, and means for detachably connecting the mats for constraining them from substantial edgewise movement bodily relative to each other and for permitting the cover mat to be lifted off of the bottom mat.

2. A floor mat for automobiles and comprising an imperforate, flexible, molded bottom mat having a plurality of upstanding self-supporting and restoring integral ribs on its upper face and defining a multiplicity of liquid retaining concavities which are open upwardly and are isolated from each other, a thin cover mat of water-proof material overlying said upper face and resting on the ribs, said cover mat having apertures therein communicating with at least some of the concavities, said cover mat being otherwise imperforate, and means detachably connecting the mats so that the cover mat can be lifted off of the bottom mat and expose the concavities for cleaning.

3. A floor mat according to claim 2 characterized in that said cover mat is tough, molded plastic material.

4. A floor mat according to claim 1 characterized in that said cover mat is molded material and has a multiplicity of closely spaced ribs distributed over its underface and arranged to cooperate with the upper margins of the ribs of the bottom mat to resist relative movement of the mats edgewise, said nibs projecting downwardly abruptly from the normal undersurface of the cover mat a substantial distance relative to the thickness of the mat for receiving the crests of the ribs therebetween.

5. A floor mat according to claim 2 characterized in that the bottom mat has a plurality of ribs on its underface, said ribs projecting downwardly abruptly from the normal undersurface of the bottom mat a substantial distance so as to extend into said apertures in the cover mat, and being positioned to fit into the apertures for interlocking the mats against relative movement edgewise when the cover mat is disposed in underlying relation to the bottom mat.

6. A floor mat according to claim 5 characterized in that said cover mat has a multiplicity of closely spaced nibs distributed over its underface, said nibs of the cover mat projecting downwardly abruptly from the normal undersurface of the cover mat a substantial distance relative to the thickness of the cover mat for receiving the crests of the ribs therebetween.

7. A floor mat for automobiles and comprising an imperforate, flexible, molded bottom mat having a plurality of upstanding integral ribs on its upper face and defining a multiplicity of liquid retaining concavities which are open upwardly and are isolated from each other, a thin flexible cover mat of waterproof material overlying said upper face and resting on the upper edges of the ribs, said cover mat having apertures therein aligned with the concavities, and said cover mat being otherwise imperforate, said cover mat having annular reinforcing ribs surrounding the apertures, respectively, and depending from the underface of the cover mat, the wall surfaces of the ribs of the bottom mat bounding each concavity converging downwardly toward the bottom of their associated concavity, and each annular reinforcing rib being arranged to engage at its lower edge said downwardly converging wall surfaces of its associated concavity to resist deflecting the cover mat into the concavity.

8. A mat according to claim 1 characterized in that said cover mat has an integral marginal flap adapted to underlie a portion of the margin of the bottom mat while the cover mat is in said overlying position.

9. A mat according to claim 1 characterized in that said cover mat has on its underface, an integral marginal pocket at at least one margin and adapted to snugly accommodate a corresponding margin of the bottom mat.

10. A floor mat for automobile floors and comprising a flexible, molded bottom mat having a portion adapted to overlie a relatively flat floor portion, an apron at one end of the floor portion and which is adapted to be flexed so as to slope outwardly upwardly from the upper face of the portion, a cover mat detachably resting on and overlying the floor portion and at least part of the apron, an integral rib on the apron and extending upwardly from the upper face thereof and extending generally transversely of the bottom mat, means to hold the cover mat in position on the floor portion with one edge parallel to and against the rib when the apron is at a flatter upward slope than normal relative to the floor portion, said edge and rib being engageable under tight pressure consequent upon flexing the apron farther upwardly to its normal sloped relation.

11. A floor mat for automobiles comprising an imperforate, flexible bottom mat having a plurality of upstanding integral ribs on its upper face, a thin flexible cover mat of water-proof material detachably overlying said upper face and supported on the upper edges of said ribs, said cover mat having lugs dependent from its undersurface and extending a substantial distance into the spaces between the ribs and being arranged to engage the side walls of the ribs so as to constrain the cover mat from movement edgewise relative to the bottom mat.

12. A floor mat according to claim 11 characterized in that said cover mat has a plurality of perforations distributed over its surface and said perforations being in communication with at least some of the spaces between the ribs of the bottom mat, and the spaces with which the apertures communicate are adapted to retain liquids.

13. A floor mat for automobiles and comprising an imperforate, flexible, molded bottom mat having a plurality of upstanding integral ribs on its upper face, said ribs having walls exposed toward opposite sides of the mat and having walls exposed toward opposite ends of the mat, said walls being imperforate and defining material accumulating concavities, a thin flexible cover mat of water-proof material detachably overlying said upper face and resting on the upper edges of the ribs, said cover mat having lug means depending from the underface thereof and disposed between certain faces of the ribs, respectively, said lug means having faces disposed toward both sides of the cover mat, respectively, and toward both ends of the cover mat, respectively, so that certain faces of the lug means are cooperable with certain faces of the ribs so as to constrain the cover mat from substantial displacement laterally of, and endwise of, the floor mat, said lug means being substantially smaller than their associated concavities to provide material accumulating spaces in the concavities, respectively, while the lugs are accommodated therein, and said cover mat having apertures communicating with the concavities.

References Cited in the file of this patent

UNITED STATES PATENTS

| | | |
|---|---|---|
| 234,028 | Grout et al. | Nov. 2, 1880 |
| 239,159 | Gaussen | Mar. 22, 1881 |
| 1,907,689 | Vrooman | May 9, 1933 |
| 1,987,585 | Diehl | Jan. 8, 1935 |
| 2,052,605 | Clark et al. | Sept. 1, 1936 |
| 2,251,372 | Nicholson | Aug. 5, 1941 |
| 2,680,931 | Champion | June 15, 1954 |